Aug. 26, 1969     E. E. PINKMAN ET AL     3,462,867
AUTOMOBILE VISOR MOUNTED ROAD MAP
Filed Nov. 13, 1967
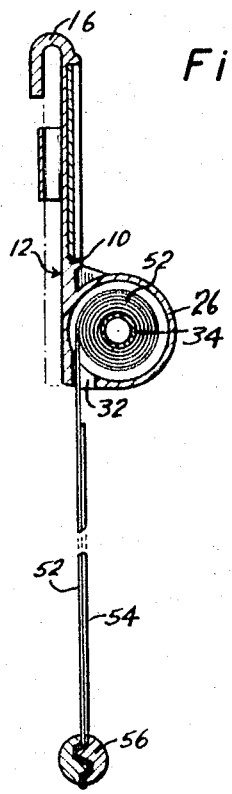
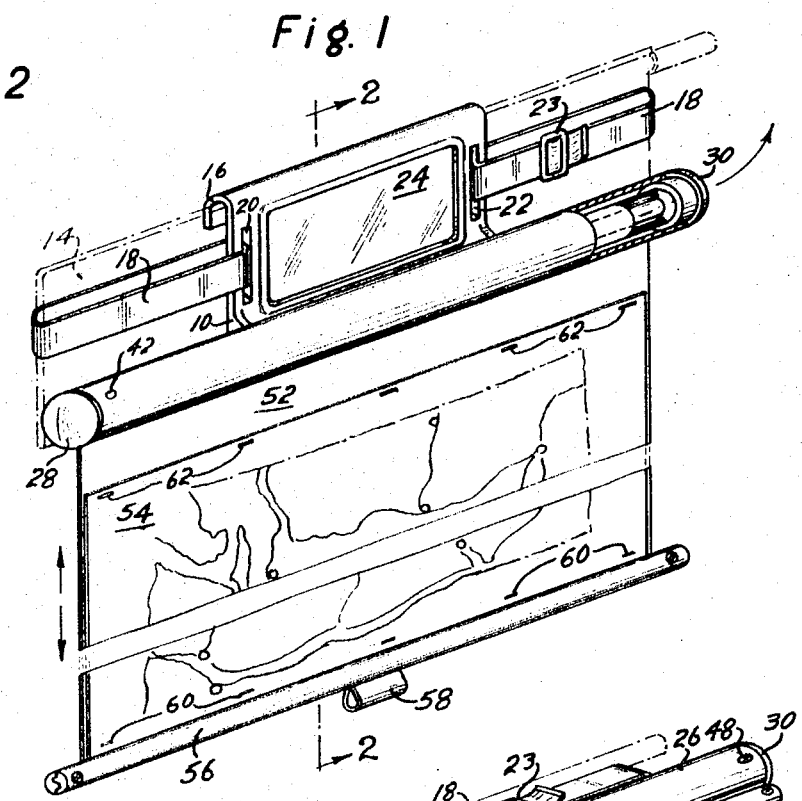
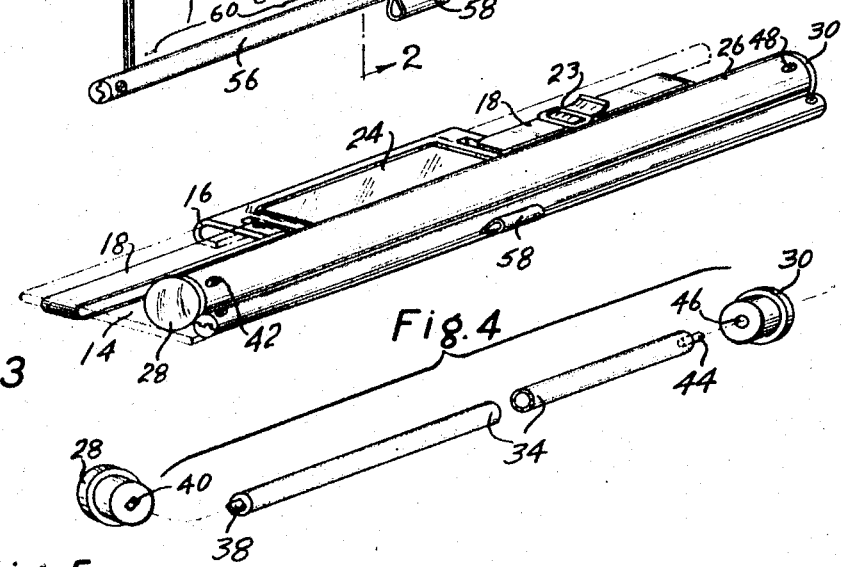
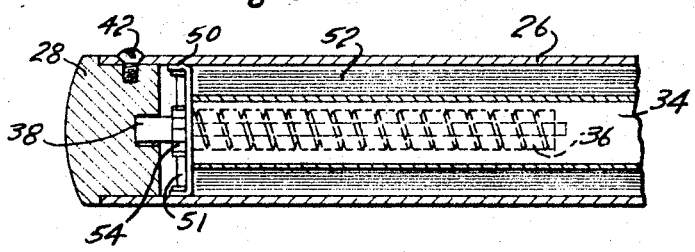
INVENTOR.
Edward E. Pinkman
Keith A. Elder
BY
ATTORNEY 3,462,867
AUTOMOBILE VISOR MOUNTED ROAD MAP
Edward E. Pinkman, 17115 Midvale Ave. N., Seattle,
Wash. 98133, and Keith A. Elder, 7125 176th St.
SW., Edmonds, Wash. 98020
Filed Nov. 13, 1967, Ser. No. 682,404
Int. Cl. G09f 11/29; G02b 7/18
U.S. Cl. 40—85                                    2 Claims

ABSTRACT OF THE DISCLOSURE

This invention relates to a spring loaded, rotatably mounted, road map carrying web, detachably mounted on the sun visor of an automobile, the visor being disposed within the automobile and adjacent the top marginal portion of the windshield thereof. Characteristics of this invention include such features, in combination, as: a base member detachably secured to the visor by hook means, carried by the base member, and detachable strap means spanning around the visor and connected with marginal portions of the base means; a tubular member housing a spring loaded roller having a helically wound web thereon, the web detachably mounting road map sheets, and with the tubular member having a web exit slot at its lower marginal portion and adjacent the base member; a mirror mounted on said base member, positioned above said tubular member and at a mid portion between the side marginal portions of the base member; and cap members removably mounted in the end portions of the tubular member, which cooperate with shaft end portions of a spring loaded roller to permit a web carrying map wound on said roller to be unwound and held in desired road map viewing positions or wound and held in such relation on said roller.

---

This invention relates to a road map holder mechanism attached to the conventional sun visors of automobiles. It is common to provide sun visors within automobiles and hingedly mount the same above and adjacent the top marginal edge portion of a windshield glass of an automobile. Such visors are utilized as a mounting means for the structure of this invention.

Further, this invention relates to mounting means for road maps so that pertinent geographical sections of road maps may be readily displayed and at a location and in such manner as best meets the convenience of the driver of the automobile.

It is an object of this invention to provide a simple and inexpensive device of a nature, so that suitable road maps, or sections thereof, are displayed within the vision of the driver of the automobile and at an elevation slightly above the view area of the driver normally used in driving the automobile.

It is another object to provide a spring loaded, rotatably mounted, map-carrying web, detachably mounted on such visor and characterized by having a base member detachably mounted on such visor.

A further object is to provide such base member with a hook member projecting upwardly from the base member and which hook member detachably engages such visor and with strap means secured to side marginal edge portions of said base member and which strap means detachably connect said base member to such visor.

A further object is to provide a tubular member carried by a lower marginal portion of said base member and having a web exit slot thereof disposed adjacent the lower marginal portion of said base member.

A further object is to provide a construction so that said base member, said hook member, said tubular member, and a longitudinally extending exit slot from said tubular member, may all be formed integrally and may be molded from any suitable plastic.

A further object is to provide a mirror, carried by said base member, disposed below said hook member, above said tubular member, and between the side marginal portion of the base member.

A further object of this invention is to provide in said tubular member, a spring loaded roller having a helically wound web thereon, the web detachably mounted road map sheets.

A further object is to provide cap members slidably mounted in the end portions of the tubular member and which cap members cooperate with end portions of a spring loaded, web-carrying, roller, permitting a sheet road map to be detachably mounted on said web and to be unwound and held in desired road map viewing position or wound and maintained out of viewing position.

Other objects of this invention will become now readily apparent or will become implicit from the following detailed consideration of the accompanying drawing.

In said drawing, FIGURE 1 is a perspective view of a device of this invention, shown with the sun visor of an automobile in phantom and vertically oriented, with the web extended, and with portions broken away;

FIG. 2 is a sectional view taken substantially on broken line 2—2 of FIG. 1;

FIG. 3 is a perspective view, with the sun visor horizontally oriented, taken substantially at right angles to the showing of FIG. 1, and with the web retracted;

FIG. 4 is an exploded perspective view, with parts broken away, and with the cap members turned to provide a clear showing, of the spring actuated roller and the associated cap members; and FIG. 5 is a fragmentary sectional view on a larger scale, of an end portion of the spring actuated roller, the web wound thereon, and a projecting tine shaft end portion of the roller and its associated cap member.

Like reference numerals designate corresponding parts throughout the several figures of the drawing thus briefly described.

A base member 10 has a relatively flat back surface portion 12 which is adapted to lie substantially flush against any conventional sun visor 14 of an automobile (not shown). To hold said base member 10 against said visor 14 and prevent relative movement therebetween, hook member 16 and strap member 18 are provided. The hook member 16 projects upwardly from the base member 10 and the hook portion thereof is adapted to hook over and engage the upper marginal portion of the visor 14. The strap member 18 may be secured to the base member 10 and to the visor 14 by having one end portion of the strap member secured to a slot 20 in base member 10. Thereafter the said strap is passed over the front side portion of the visor 14 (as viewed in FIG. 1), thence over and about a side edge portion, thence across the back of the visor 14, thence over and about the other side edge portion of the visor, and thence across the front surface portion of the visor until the strap is engaged with the slot 22 in the opposite side edge portion of the base member 10.

To provide the desired tautness of strap member 18, the same may be made of an elastic material (not shown), or a buckle 23 may be interposed intermediate the length of the strap 18. Thus, the strap 18, when appropriately tightened will secured the base member 10 to the visor 14 and prevent relative movement between them.

Also, the said strap 18 is connected to the side marginal portions of the base member 10 leaving a mid portion of the base member 10, between the side marginal portions thereof, on which to mount a mirror 24. The mirror 24 may be utilized as a rear view mirror or as a person convenience mirror, as desired. As most sun visors are pivotally mounted at the upper edge portions thereof, this provides for the adjustable mounting of said mirror 24 for the convenience of occupants of the automobile.

Base member 10 supports a transversely extending tubular member 26. The tubular member 26 is open at both ends, one end portion thereof slidably receives a cap member 28 and the other, receives a cap member 30. The tubular member 26 extends substantially in a horizontal plane when in use and a slot 32 therein extends longitudinally of the tubular member 26, adjacent base member 10, and lies substantially in a horizontal plane when in use.

A preferred construction is one where the base member 10, hook member 16, and tubular member 26 are made of a suitable plastic material and are all formed integral as a single molded structure and at the same time, the said slot 32 is formed.

A roller 34 is actuated in the same manner as a house window shade roller is actuated, in other words, it contains a spring 36, one end of the spring being attached to the roller 34 and the other end being attached to a shaft 38, a tine or flattened end portion of which engages in slotted opening 40 of cap member 28. Set screw 42 detachably secures cap member 28 in one end portion of the tubular member 26 and also set screw 42 prevents rotary movement of cap member 28 relative to the tubular member 26. At the other end portion, roller 34 carries a coaxial shaft 44, a cylindrical end portion or tine of which is rotatably mounted in the opening 46 in cap member 30. Set screw 48 detachably secures cap member 30 in the other end portion of tubular member 26.

The roller 34 carries a hub 50 and this hub 50 in turn carries the usual retaining pawls 51 that are adapted to engage in notches 54 of shaft 38 by virtue of which the web 52 may be drawn out through slot 32 a desired amount and then stopped at various points (an illustrative amount thereof being shown in FIG. 1) and then the web retracted (this position being illustrated in FIG. 2). The roller 34 and the web 52 helically wound thereon (including a map 54 detachably connected to said web 52) may be readily removed from the tubular member 26 by removing either set screw 42 or 48 along with the matching cap member 28 or 30 and then sliding the roller 34 lengthwise of the tubular member 26 and with any depending portion of the web 52 passing through slot 32. After such removal, a desired map 54 may be detachably connected to the web 52 and an amount of web 52 as desired may be rolled on roller 34.

Preferably, sufficient tension is provided by spring 36 so that web 52 will readily assume the position shown in FIG. 3 and with the spring 36 still under tension. Thus, a stop is necessary so that the web is held in such position. Such a stop is illustrated by two members 56 secured together by screws 57 and with the free end portion of the web 52 secured between members 56. The overall size of the two members 56 is such that they will not pass through slot 32 and the members 56 will be held, by spring tension from spring 36, in the position shown in FIG. 3 of the drawing. A pull tab 58 is connected with the tubular members 56 at a mid portion thereof.

The map 54 may be printed on a relatively large scale for easy indexing by a driver as to any then geographical location of the car. As the car travels over the area covered by the portion of the map then visible, the map 54 may be readily removed from the web 52 by removal of lower staples 60 and upper staples 62 and after removal, then the map may be refolded to expose a desired area or a new map may be employed and then such refolded map or the new map can be readily detachably positioned in placed on the web 52 by staples. Also, if desired, pressure sensitive adhesive glue lines may be located on the back surface of map sections and by the pressure sensitive adhesive readily detachably secured to the web 52.

Whenever the driver desires, the web 52 may be retracted into the position shown in FIG. 3 of the drawing and thereafter the sun visor adjusted to the then present choice of the driver.

From the foregoing, it will now be readily apparent that this invention provides a map holder which is readily engageable with a sun visor 14 on the inside of an automobile and which sun visor 14 is located above and adjacent the front windshield glass of an automobile. Next, it will be apparent that said map holder comprises a substantially flat base member 10 which is adapted to be positioned substantially flush against the said visor and which is held, in part, against the visor by reason of the hook member 16, secured to the base member 10, and which hook member 16 projects upwardly from the base member 10 and is adapted to hook over and engage with the upper marginal portion of the sun visor 14. Next, a strap member 18 is provided which connects with the side marginal portions of base member 10, as slots 20 and 22, so that the strap means is adapted to span about the sun visor 14. Thus, said strap means 18 and hook means 16 secures said base member 10 to the visor 14 and relative movement between them is prevented. Next, there is provided a tubular member 26 which is connected with the lower portion of the base member and which, when in use, extends substantially horizontally. Above the tubular member 26 and between the slots 20 and 22 at the side marginal portions of base member 10, the base member 10 carries a mirror 24, which can be used as a rear view mirror or for other purposes as desired. Next, there is provided cap members 28 and 30 which slidingly fit into the ends of the tubular member 26 and one of the cap members 28 and 30, as 28, is provided with a slotted opening 40 therein and the other of said caps 28 and 30, as 30, is provided with a bearing opening 46. Next, there is provided a spring actuated roller 34 which is mounted by said cap members 28 and 30 and such spring actuated roller 34 has a shaft 38, having a projecting spring operated flattened tine or end, which interfits with the slotted opening 40 in the cap member 28 and a coaxial shaft 44, having a rounded end or cylindrical tine, which interfits and is rotatively mounted in the opening 46 in the cap 30. Next, there is provided set screws 42 and 48 to detachably hold said cap members 28 and 30 in the tubular member 26. The roller 34 mounts a web 52 and a map 54 is detachably mounted on the web 52. The map 52, being detachably mounted, can be removed and different portions of the map may be made visible on the web 52 or an additional may 54 may be disposed for viewing on said web 52.

We claim:

1. A map holder engageable with the sun visor of an automobile, which visor is located above and adjacent the front windshield glass of an automobile comprising a substantially flat base member adapted to be positioned substantially flush against said visor; a hook member, secured to said base member, projecting upwardly therefrom, and adapted to hook over and engage an upper marginal portion of said visor; strap means connected with side marginal portions of said base member and adapted to span about said visor, said strap means and said hook means adapted to secure said base member to said visor and prevent relative movement therebetween; a tubular member connected with a lower portion of said base member and adapted to extend substantially horizontally, said tubular member having a longitudinal slot disposed adjacent said base member; a mirror carried by said base member and disposed above said tubular member; cap members slidingly fitted in the ends of said tubular member, one of said caps having a slotted opening therein and the other of said caps having a bearing opening therein; a spring actuated roller mounted on said caps and having a projecting spring operating flattened tine axle end portion interfitted with the slotted opening in said one cap and having a cylindrical tine axle end portion rotatably mounted in the bearing opening of said other cap; set screw means detachably securing said one cap, having said slotted opening, to said tubular member, preventing rotation of said cap relative to said tubular member; a web helically wound on said spring actuated roller; sheet map means detachably mounted on said web; and a cross rod carried by the free end portion of said web limiting travel of said web in one direction.

2. The combination of claim 1, wherein said base member, said hook member, and said tubular member are integral and single molded structure.

References Cited

UNITED STATES PATENTS

| | | | |
|---|---|---|---|
| 1,583,998 | 5/1926 | Richey | 40—85 |
| 2,097,419 | 10/1937 | Schmidt | 248—475 X |
| 2,188,612 | 1/1940 | Owen et al. | 40—85 |

EUGENE R. CAPOZIO, Primary Examiner

WILLIAM H. GRIEB, Assistant Examiner

U.S. Cl. X.R.

248—475